(12) United States Patent
Fossum

(10) Patent No.: US 10,523,886 B2
(45) Date of Patent: Dec. 31, 2019

(54) IMAGE SENSOR WITH CONTROLLABLE EXPOSURE RESPONSE NON-LINEARITY

(71) Applicant: TRUSTEES OF DARTMOUTH COLLEGE, Hanover, NH (US)

(72) Inventor: Eric R. Fossum, Wolfeboro, NH (US)

(73) Assignee: TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 15/546,622

(22) PCT Filed: Jan. 27, 2016

(86) PCT No.: PCT/US2016/015240
§ 371 (c)(1),
(2) Date: Jul. 26, 2017

(87) PCT Pub. No.: WO2016/123269
PCT Pub. Date: Aug. 4, 2016

(65) Prior Publication Data
US 2018/0013970 A1  Jan. 11, 2018

Related U.S. Application Data

(60) Provisional application No. 62/107,959, filed on Jan. 26, 2015.

(51) Int. Cl.
*H04N 5/378* (2011.01)
*H04N 5/355* (2011.01)
*H04N 5/3745* (2011.01)

(52) U.S. Cl.
CPC ......... *H04N 5/378* (2013.01); *H04N 5/35509* (2013.01); *H04N 5/35518* (2013.01); *H04N 5/35545* (2013.01); *H04N 5/37455* (2013.01)

(58) Field of Classification Search
CPC ............... H04N 5/378; H04N 5/35545; H04N 5/35509; H04N 5/35518; H04N 5/37455
See application file for complete search history.

(56) References Cited

U.S. PATENT DOCUMENTS 5,812,203 A * 9/1998 Swan ................. H04N 7/012
348/446
2007/0103731 A1* 5/2007 Tse ................... H04N 1/4092
358/3.27

(Continued)

FOREIGN PATENT DOCUMENTS

EP       2 770 730 A1    8/2014
WO   WO 2012/121599 A1   9/2012

(Continued)

OTHER PUBLICATIONS

Peter Seitz, Single Photon Imaging, 2011.*

(Continued)

*Primary Examiner* — Twyler L Haskins
*Assistant Examiner* — Akshay Trehan
(74) *Attorney, Agent, or Firm* — David V. Rossi; Haug Partners LLP

(57) ABSTRACT

The present disclosure relates generally to apparatus and methods for image sensing, and, more particularly, to a multi-bit quanta image sensor (QIS) having a controllable (e.g., adjustably variable) exposure response characteristic. Some embodiments provide an apparatus and method wherein the non-linearity of the response of a multi-bit QIS is controllable (e.g., selectively variable) by dynamically choosing the bit depth n during A/D conversion, and/or later (i.e., post-conversion) by firmware and/or software.

17 Claims, 4 Drawing Sheets

(56) References Cited

U.S. PATENT DOCUMENTS

| | | | | |
|---|---|---|---|---|
| 2008/0218602 A1* | 9/2008 | Kozlowski | ............ | H04N 3/155 348/231.99 |
| 2011/0019051 A1* | 1/2011 | Yin | ............ | H04N 5/347 348/311 |
| 2011/0038408 A1* | 2/2011 | Jacob | ............ | H04N 21/2343 375/240.01 |
| 2012/0281126 A1 | 11/2012 | Fossum | | |
| 2013/0033616 A1* | 2/2013 | Kaizu | ............ | H04N 5/35554 348/222.1 |
| 2014/0211058 A1* | 7/2014 | Nishihara | ............ | H04N 5/378 348/308 |
| 2014/0267616 A1* | 9/2014 | Krig | ............ | H04N 13/0271 348/46 |

FOREIGN PATENT DOCUMENTS

| | | | | |
|---|---|---|---|---|
| WO | WO 2012121599 A1 * | 9/2012 | ............ | G01N 29/14 |
| WO | WO 2015/006008 A1 | 1/2015 | | |
| WO | WO 2015006008 A1 * | 1/2015 | ......... | H01L 27/1461 |

OTHER PUBLICATIONS

Jillings. The Pierre-Auger PMT Test Stand. Feb. 6, 2002.*
Seitz, et al., Single Photon Imaging. 2011. [retrieved on Mar. 1, 2016]. Retrieved from the Internet:<URL:http://www.beck-shop.de/fachbuch/leseprobe/9783642184420_Excerpt_001.pdf>. entire document.
Jillings. The Pierre-Auger PMT Test Stand. Feb. 6, 2002 (Feb. 6, 2002). [retrieved on Mar. 1, 2016]. Retrieved from the Internet:<URL:https://www.google.com/search?q=%22LSB+corresponds%22+to+one+photoelectron&ie=utf-8&oe=utf-8#q=LSB+corresponds+to+one+photoelectron&start=10>. entire document.
International Search Report and Written Opinion dated Mar. 25, 2016 in corresponding International Application No. PCT/US2016/015240 . (12 pages total.).
Fossum Eric R., "Modeling the Performance of Single-Bit and Multi-Bit Quanta Image Sensors", IEEE Journal of the Electron Devices Society, IEEE, USA, vol. 1, No. 9, Sep. 1, 2013 (Sep. 1, 2013), pp. 166-174, XP011536322.
Supplementary European Search Report dated Jun. 21, 2018 by the European Patent Office in corresponding European Application No. 16744066.8.

* cited by examiner

IMAGE SENSOR WITH CONTROLLABLE EXPOSURE RESPONSE NON-LINEARITY

RELATED APPLICATIONS

This application is filed pursuant to 35 U.S.C. § 371 based on International Application No. PCT/US2016/015240, filed Jan. 27, 2016, which claims the benefit of U.S. Provisional Application No. 62/107,959, filed Jan. 26, 2015, which is hereby incorporated herein by reference in its entirety.

BACKGROUND

The present disclosure relates generally to apparatus and methods for image sensing, and, more particularly, to a multi-bit quanta image sensor (QIS) having a controllable (e.g., adjustably variable) exposure response characteristic.

The single-bit Quanta Image Sensor (QIS) was disclosed in 2005 (as a digital film sensor) as a possible evolution of solid-state image sensors with integrated signal collection and scanned readout (like CMOS image sensors today) where pixels are shrunk to sub-diffraction limit size, the number of pixels increased substantially to gigapixel or more, read noise reduced to allow reliable single photoelectron detection (e.g., read noise of ~0.3 e- rms or less, sufficient to discriminate from readout noise), and readout rate increased to avoid saturation of the sensor under normal imaging conditions. See E. R. Fossum, *What to do with Sub-Diffraction-Limit (SDL) Pixels?—A Proposal for a Gigapixel Digital Film Sensor (DFS)*, Proc. of the 2005 IEEE Workshop on Charge-Coupled Devices and Advanced Image Sensors, Karuizawa, Japan, June 2005, the contents of which are hereby incorporated herein by reference in their entirety. Image pixels and image frames are then formed from the resultant spatio-temporal x-y-t data cube. The data cube is composed of bit planes or fields, with pixels formed from "cubicles" of bits in a localized region of 2D space and time. Further aspects of QIS technology and its associated temporally and spatially oversampled imaging methodology have been discussed in more detail in subsequent publications. See, e.g., E. R. Fossum, *The Quanta Image Sensor (QIS): Concepts and Challenges* in Proc. 2011 Opt. Soc. Am. Topical Meeting on Computational Optical Sensing and Imaging, Toronto, Canada Jul. 10-14, 2011; and S. Masoodian, et al., *Early Research Progress on Quanta Image Sensors*, in Proceedings of the 2013 International Image Sensor Workshop, Snowbird, Utah USA Jun. 12-16, 2013, each of which is hereby incorporated herein by reference in its entirety.

In the single-bit QIS, each photodetector ("jot") in the array is binary in nature, with a signal corresponding to either no photoelectron, or one (or more) photoelectrons. The response of the sensor, in terms of bit density (local density of jots that have received a photoelectron during the integration period), gives rise to the so-called D-log H S-shaped response curve, well known in film since the late 1800's. More specifically, the single-bit QIS has a non-linearity in the number of "jots" that have a binary signal of "1" as a function of exposure. This non-linearity is determined by Poisson statistics and also yields significant overexposure latitude compared to conventional CMOS image sensor pixel response as a function of exposure. Detailed analysis of the response of the QIS was presented in 2013, in E. R. Fossum, *Modeling the performance of single-bit and multi-bit quanta image sensors*, IEEE J. Electron Devices Society, vol. 1(9) pp. 166-174 September 2013, which is hereby incorporated herein by reference in its entirety.

The latter publication also presents analysis for a multi-bit QIS, which was disclosed earlier in 2013, and may be understood as being an in-between image sensor, between CIS/DIS and the single-bit QIS. See, E. R. Fossum, *Application of Photon Statistics to the Quanta Image Sensor*, in Proceedings of the 2013 International Image Sensor Workshop, Snowbird, Utah USA Jun. 12-16, 2013; E. R. Fossum, *Modeling the performance of single-bit and multi-bit quanta image sensors*, IEEE J. Electron Devices Society, vol. 1(9) pp. 166-174 September 2013; and S. Chen, A. Ceballos, and E. R. Fossum, *Digital Integration Sensor*, in Proceedings of the 2013 International Image Sensor Workshop, Snowbird, Utah USA Jun. 12-16, 2013, each of which is hereby incorporated by reference herein in its entirety.

In the multi-bit QIS, the output of each multi-bit jot is an analog signal that is subsequently digitized by an ADC. The digital value is in the range of 0 to $2^n-1$ where the digital value is equal to the number of photoelectrons captured in the jot during the exposure and n is the bit depth of the ADC in the readout electronics. For example consider n=4. A 4b multi-bit QIS would have an output from 0 to 15, representing the number of photoelectrons that were captured. In other words, compared to the strict binary output of the single-bit QIS, in the multi-bit QIS the digital output signal S is equal to the number of photoelectrons up to the full well capacity, where $0 \leq S \leq 2^n-1$, where the bit depth n is relatively low, such as $1 < n \leq 4-6$, corresponding to a full well capacity from perhaps, by way of example, 15 to 63 photoelectrons. The multibit QIS has reduced exposure response non-linearity compared to a single bit QIS, and reduced overexposure latitude. For larger n, the linearity is improved and the overexposure latitude is decreased.

SUMMARY OF SOME EMBODIMENTS

Some embodiments of the present disclosure comprise methods and apparatus providing for the non-linearity of the response of an image sensor to be controllable (e.g., selectively variable) by dynamically choosing the bit depth n during A/D conversion, and/or later (i.e., post-conversion) by firmware and/or software.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provide one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of embodiments of the invention, both as to structure and operation, will be understood and will become more readily apparent when the invention is considered in the light of the following description made in conjunction with the accompanying drawings, in which like reference numerals designate the same or similar parts throughout the various figures, and wherein.

DETAILED DESCRIPTION OF SOME EMBODIMENTS

Throughout the description and claims, the following terms take at least the meanings explicitly associated herein, unless the context dictates otherwise. The meanings identified below do not necessarily limit the terms, but merely provide illustrative examples for the terms.

The phrase "an embodiment" as used herein does not necessarily refer to the same embodiment, though it may. Similarly, the phrase "some embodiments" as used herein at different instances does not necessarily refer to the same "some embodiments," though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

Further, as used herein with respect to the image plane (e.g., corresponding to a plan view of an image sensor), it will be understood that for ease of reference and clarity of exposition with respect to a regular, rectangular (e.g., square) array, having elements arranged in a row/column configuration, the terms "vertical" and "horizontal" will be used herein to refer to orthogonal directions between nearest neighbor color elements, whereas "diagonal" will be used herein to refer to the direction between next-nearest-neighbor color elements. While these terms may reflect the perspective of the referenced figures on the page and/or conventional reference to image sensor pixel arrays with respect to readout circuitry, it is understood that no preferred orientation is implied by such nomenclature; e.g., "row" and "column" designations are interchangeable, as are "horizontal" and "vertical" designations.

As noted, the multibit QIS has reduced non-linearity compared to a single bit QIS, and reduced overexposure latitude. For larger n, the linearity is improved and the overexposure latitude is decreased; that is, the linearity of the sensor response is directly related to the full-well bit depth n. In other words, for single-bit and multi-bit QIS devices, the larger the full well (i.e. the greater n), the more linear the response becomes, and less overexposure latitude is allowed. In this regard, it will be understood that this behavior is consistent with, as n becomes larger, the more the multi-bit QIS photoresponse resembles that of the conventional CMOS image sensor (CIS).

Figure 1:
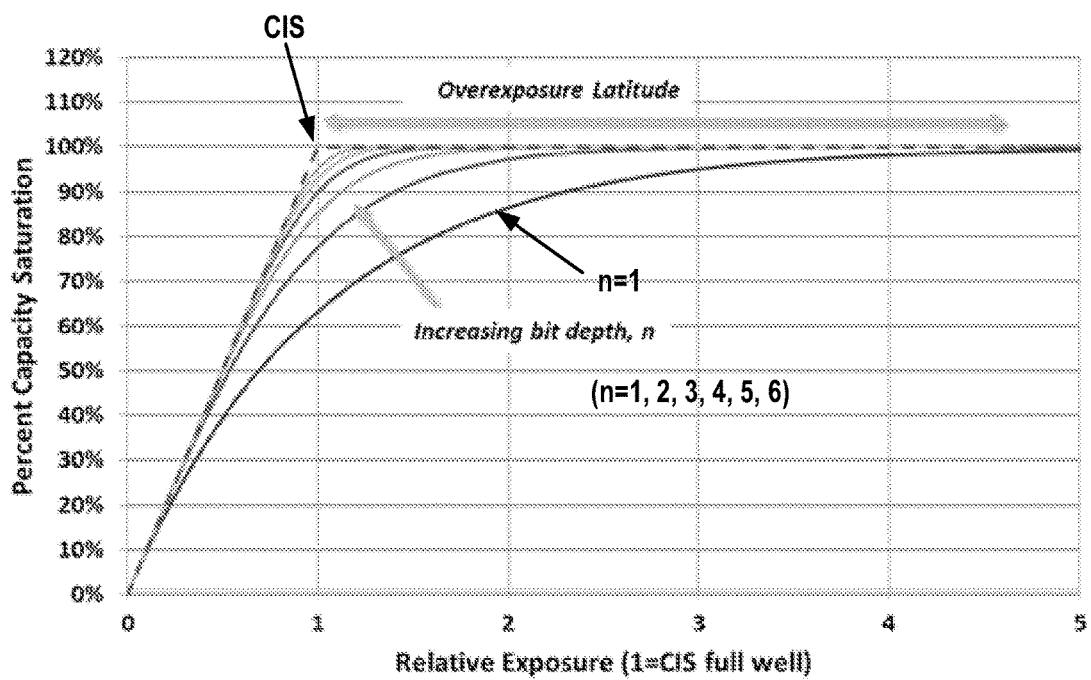
FIG. 1 shows, by way of example, the comparative non-linearity of the response and associated saturation characteristics of a single-bit and multi-bit QIS for 1≤n≤6 bits, as well as the response for a conventional CMOS image sensor (CIS)

FIG. 1 shows, by way of example, the comparative non-linearity of the response and associated saturation characteristics of a single-bit and multi-bit QIS for 1≤n≤6 bits, as well as the response for a conventional CMOS image sensor (CIS). For the QIS, the capacity of the full well is given by $FW=2^n-1$. The relative exposure is the quanta exposure H (in photoelectrons) divided by the full well (i.e., a relative exposure of unity is the exposure where, on average, each pixel or jot has received FW photoelectrons), and the percent saturation is calculated from the expected number of photoelectrons in the photosite. Generally for the QIS, a "cubicle" in x, y, and t might be summed. At a relative exposure of 1, the quanta exposure $H=FW=2^n-1$, and expected % capacity saturation is given by:

$$\% \, Cap = \frac{100}{FW}\left[\sum_{k=1}^{FW} k \frac{e^{-H}H^k}{k!} + \sum_{k=FW+1}^{\infty} FW \frac{e^{-H}H^k}{k!}\right]$$

which can be fit by $\% \, Cap=100[1-e^{-n^u}]$ with u=0.6 yielding % Cap=0.63, 0.78, 0.85, 0.90, 0.93 and 0.95 for n=1, 2, 3, 4, 5, 6 respectively (see relative exposure of unity in FIG. 1), thus revealing some sense of the non-linearity of the response.

As can be seen, the relative response of an ideal conventional CMOS image sensor (dashed line) is linear up to an exposure that yields full-well saturation, and then flat beyond that. The response of a multi-bit QIS for large n (e.g., n=6) is close to that of the conventional CMOS image sensor. As n becomes smaller the non-linearity increases and the overexposure latitude also increases down to n=1 for the single-bit QIS.

It will be understood that the non-linearity of the single-bit QIS results from the low (one electron) full well. As soon as one electron is collected by the jot, it is full, and additional electrons collected in the same jot do not increase the signal from the sensor. Thus, while on average each jot may have received one photoelectron at a quanta exposure H=1, due to this process typically only 63% of jots are occupied, many with more than one photoelectron; the remainder are "empty". As the bit depth increases from 1 to n, there is a continual decrease in non-linearity (the signal becomes more linear) and decrease in overexposure latitude, as illustrated in FIG. 1. By n=5, the strong non-linearity has nearly vanished and the response approaches the linear response of the conventional/regular CIS. This is because now each jot can contain, say, 31 electrons before it saturates, providing a larger linear range of response.

It will also be understood that the number of photoelectrons collected for a relative exposure of unity depends on n, and for a single photosite, this impacts SNR due to shot noise. To collect the same number of electrons for smaller values of n, either the number of fields must be increased and digitally summed, or more neighborhood jots must be aggregated, or some combination, since this number ultimately determines the image pixel SNR.

Figure 2:
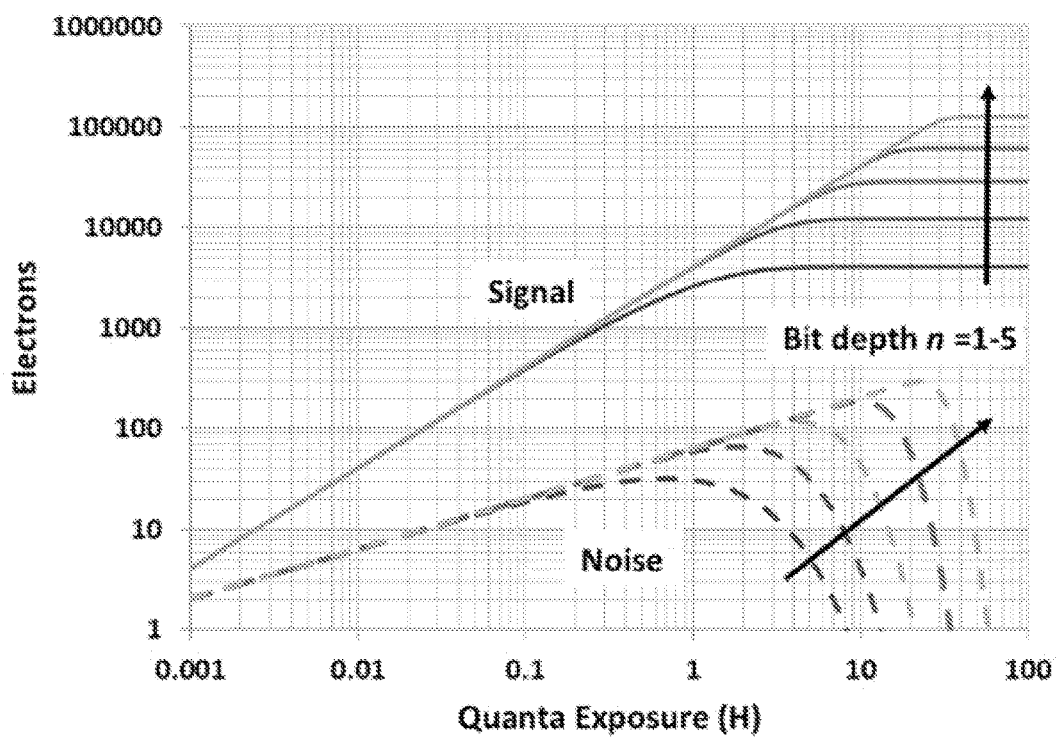
FIG. 2 shows signal and noise as a function of exposure for a QIS jots with varying bit depth.

FIG. 2 shows signal and noise as a function of exposure for a QIS jots with varying bit depth. The signal is the sum over 4096 jots (e.g., 16×16×16), the saturation signal being 4096 ($2^n-1$).

In accordance with some embodiments of the present disclosure, the non-linearity of the response of a multi-bit QIS is controllable (e.g., selectively variable) by dynamically choosing the bit depth n during A/D conversion, and/or later (i.e., post-conversion) by firmware and/or software.

Figure 3:
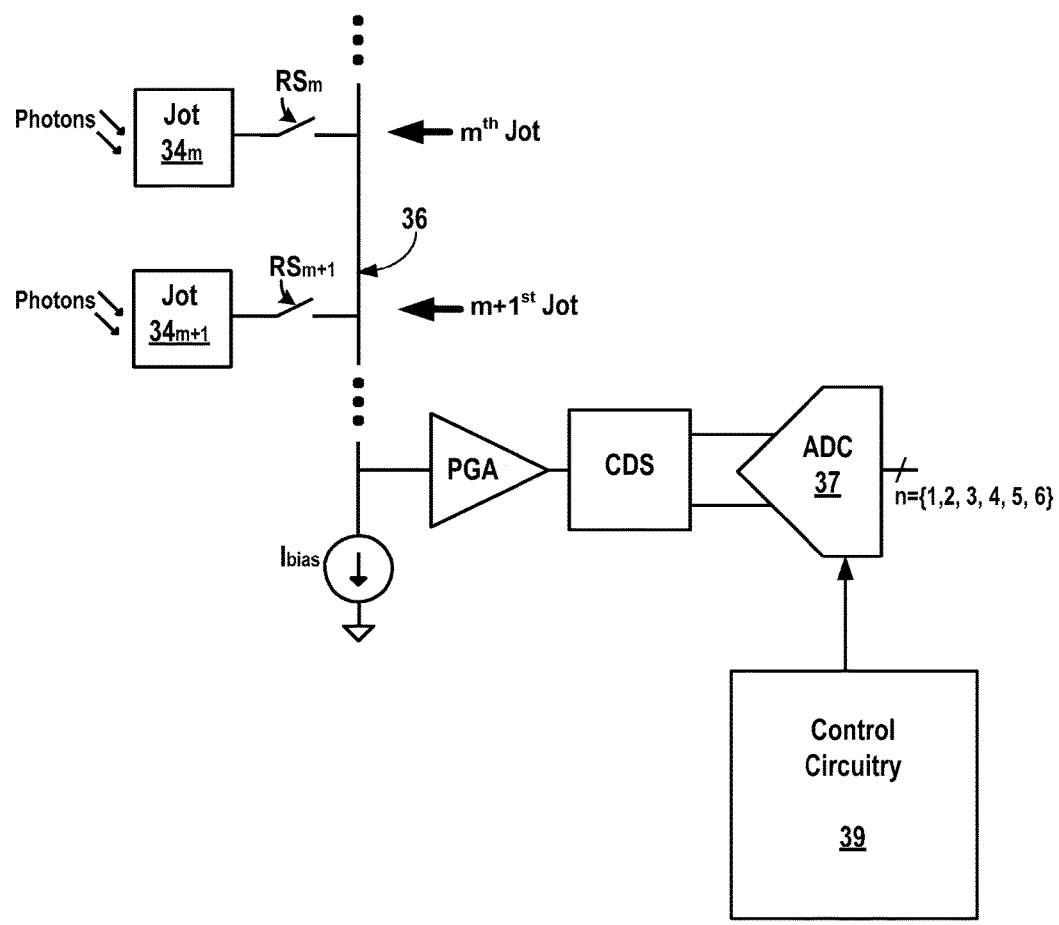
FIG. 3 depicts an illustrative simplified readout signal chain associated with a column of a multi-bit QIS, in accordance with some embodiments of the present disclosure.

Referring now to FIG. 3, an illustrative simplified readout signal chain associated with a column of a multi-bit QIS is schematically depicted, in accordance with some embodiments for controlling (e.g., dynamically varying) the effective bit depth of an ADC in the readout signal chain of a multi-bit QIS so as to control (e.g., dynamically vary) the non-linearity and overexposure-latitude characteristics of the multibit QIS. For clarity of exposition, only two neighboring jots (i.e., $Jot_m$ and $Jot_{m+1}$) associated with the same column bus 37. Also, for clarity in depicting that $Jot_m$ and $Jot_{m+1}$ may be independently selectively coupled to column bus 37 (for readout), row-select switches (e.g., transistors) $R_m$ and $R_{m+1}$ are depicted outside of $Jot_m$ and $Jot_{m+1}$ (though the row-select switched may be considered as being part of the in-jot readout circuitry). As can be seen, similar to various implementations of a conventional CIS, the readout chain includes a programmable gain amplifier PGA, correlated double sampling circuitry CDS.

As will be understood, readout of the jots (e.g., $Jot_m$ and $Jot_{m+1}$) is analogous to readout of accumulated charge from pixels in conventional CISs. (As such, for clarity of exposition, not all timing/control signals are shown.) During readout, the jot output signal (e.g., output from an in-jot source-follower amplifier) corresponding to the charge accumulated in the jot is coupled to column bus 36, resulting in a corresponding analog signal being coupled to the input of ADC 37 via PGA and CDS circuitry. ADC 37 converts the input analog signal into an n-bit digital signal, wherein the bit width (n) is, in this embodiment, selectable by control circuitry 39 as any n, wherein $1 \leq n \leq 6$.

As described, in this illustrative embodiment, the effective bit depth of ADC 37 is dynamically varied according to Control Circuitry 39 controlling the actual conversion bit depth (e.g., resolution) of ADC 37 itself. Control Circuitry 39 may be monolithically integrated with ADC 37 (e.g., "on-chip"), or on one or more separate integrated circuits (e.g., "off-chip" with respect to ADC 37), or both, depending on the implementations.

Also, in accordance with the illustrative embodiment of FIG. 3, the LSB corresponds to one photoelectron. It will be understood, however, that in various alternative embodiments, it is also possible to use an ADC where the LSB is less than the equivalent of one photoelectron (e.g., 0.2 electrons). In such implementation, for the purpose of some embodiments of the present disclosure, the ADC output may be linearly scaled (e.g., 5 LSBs scaled to 1 LSB) so that the scaled ADC output is nominally equal to one photoelectron.

In the illustrative embodiment, the ADC's bit depth capable of being dynamically varied from 1 to 6 allows for concomitantly reducing the field rate up to 64× for constant flux capacity. As will be understood, control of the ADC may account for tradeoffs between bit depth, ADC power, total readout power and field rate.

For example, the QIS "flux capacity" is given by $\phi_{wn}=jf_r(2^n-1)/\sigma\bar{\gamma}$ where j is the jot density, $f_r$ is the field readout rate, $\sigma$ the shutter duty cycle, and $\bar{\gamma}$ the average QE. Increasing the bit depth can reduce the field readout rate for constant flux capacity, for example. A reduced field-readout rate can reduce sensor power dissipation, but the multi-bit ADC dissipates more power than single-bit due to more comparator strobes. The two effects may nearly cancel.

In accordance with development of embodiments of the present invention, a preliminary study on the impact of bit depth on power dissipation in the QIS has been performed. ADC designs included a 1b ADC, a single-slope ADC (power scales exponentially with bit depth at same field rate), and two algorithmic ADCs—successive approximation and cyclic. Some results from this study are summarized in the following table, which shows power dissipation of single-bit and multibit QIS ADCs operating at different resolutions, and at different speeds for constant flux capacity (discussed further hereinbelow).

| VDD = 1.8 V Power unit: uW | 1 b & 1 MSa/s | 2 b & 333 kSa/s | 3 b & 143 kSa/s | 4 b & 64 kSa/s | 5 b & 32 kSa/s |
|---|---|---|---|---|---|
| 1 bit-ADC | 1.5 | NA | NA | NA | NA |
| Single slope | NA | 2.8 | 3.1 | 3.3 | 3.7 |
| SAR | NA | 2 | 1.4 | 0.9 | 0.5 |
| Cyclic(1 bit/cycle) | NA | 3 | 2 | 1.4 | 0.9 |

It can be seen that the single-slope ADC power remains relatively flat with increasing bit depth and decreasing speed, but both algorithmic ADCs show a favorable decline in power dissipation. However, area utilization is unfavorable for the successive approximation ADC and the cyclic ADC is more complex to design.

For a multi-bit QIS to preserve accurate photoelectron counting, the bit depth n needs to be limited, such that the pre-ADC gain non-uniformity, $\delta G/G$, including FD conversion gain, is approximately less than $\frac{1}{2^n}$. For high conversion gain jots, gain non-uniformity will likely be higher than for conventional CIS. Thus for example, a 5% gain non-uniformity would suggest that the bit depth n be capped at 4 bits.

In order to handle a photon flux $\phi$ under normal lighting conditions, the jot density and readout rate must be relatively high. Generally, sub-diffraction-limit jot density and field rate is driven mostly by flux capacity and not necessarily by improved spatial or temporal resolution of the final image. It is noted that the flux capacity of the QIS increases with increasing bit depth (n). However, the bit depth n cannot be extended too far for a number of reasons. First, for example, it is desired to keep the conversion gain very high to ensure low read noise, and this limits the full well which has grown from 1 electron to ($2^n-1$) due to voltage range constraints on the signal chain in advanced technology nodes.

Second, gain variation from jot sense node capacitances and other amplification stages, will lead to errors in accurate photoelectron counting. Ideally, if the gain is G, the gain variation $\delta G/G$ should be less than $\frac{1}{2^n}$, and more likely less than $\frac{1}{2^{n+3}}$. Thus, for 1% gain variation, the bit depth n should be no more than 6, and perhaps no more than 4 for accurate counting. On the other hand, the utility of accurate photoelectron counting to the nearest photoelectron, for counts approaching 100 photoelectrons is not clear when considering shot noise, and may thus be moot in most imaging applications.

Third, the power required for the ADC grows at least linearly, and for some designs, exponentially with bit depth n. On the other hand, for constant flux capacity, the field rate or jot density can be traded for bit depth n. Reduction of either, particularly field readout rate, results in a reduction in power dissipation that may partially or entirely compensate for the increase in ADC power.

Generally, jot devices applicable to single-bit QIS architectures will work equally well with multi-bit QIS architectures. As discussed, rather than the strict binary output of the single-bit QIS, in the multi-bit QIS the digital output signal S is equal to the number of photoelectrons up to the full well capacity, where $0 \leq S \leq 2^n-1$, where the bit depth n is relatively low, such as 1<n≤4-6, corresponding to a full well capacity from perhaps, by way of example, 15 to 63 photoelectrons. Since it is relatively easy to make a full well of this capacity for minimum size jots, there is little impact on jot design or density. Also, while analyzing the read noise requirements for single-bit QIS devices, it was found that if the read noise was low enough, such as ~0.15 e– rms, then the ability to discriminate between no photoelectron, and at least one photoelectron was quite satisfactory, achieving a low bit error rate of under 1/2500. And, in fact, probably higher bit error rates could be tolerated. It was also observed that if one indeed achieved such a low read noise, for example, through the use of a high conversion gain of say, 1 mV/e–, discriminating between 0 and 1 photoelectron was essential the same difficulty as discriminating between say 11 and 12 photoelectrons. All that is required is increasing the bit depth of the ADC from one bit to n bits, where the digital number (DN) from the ADC corresponds directly to the number of photoelectrons in the jot. And, a high conversion gain of, for example, 1 mV/e– is not impacted by the larger full well since accommodating analog swings of under 100 mV is readily achieved. That is, even for high conversion gain of 1 mV/e–, n=6 corresponds to a signal swing of under 100 mV and should not overload most readout signal chains. As such, various jot devices suitable for a single-bit QIS (e.g., pump-gate jots) are also suitable for implementing multi-bit QIS devices. One illustrative example is a pump-gate jot, which may have a full-well capacity of over one hundred electrons. See, e.g., J. J. Ma and E. R. Fossum, *A Pump-Gate Jot Device with High Conversion Gain for Quanta Image Sensors*, IEEE J. Electron Devices Society, Vol. 3(2), pp. 73-77, March 2015; and PCT International Application Publication No. WO/2015/153806, filed Apr. 1, 2015; and priority U.S. Provisional Application No. 61/973,825, filed Apr. 1, 2014, each of which is hereby incorporated by reference herein in its entirety. In other words, once the read noise is low enough (e.g., ~0.15 e– rms) to enable a single-bit QIS, a multi-bit QIS sensor core and its (internal) readout comes almost for free aside from the ADC (e.g., which requires greater bit depth for a multi-bit QIS). And, as noted, if the conversion gain is the same, ADC LSB discrimination requirements are nearly the same for multi-bit as for single-bit QISs.

Figure 4:
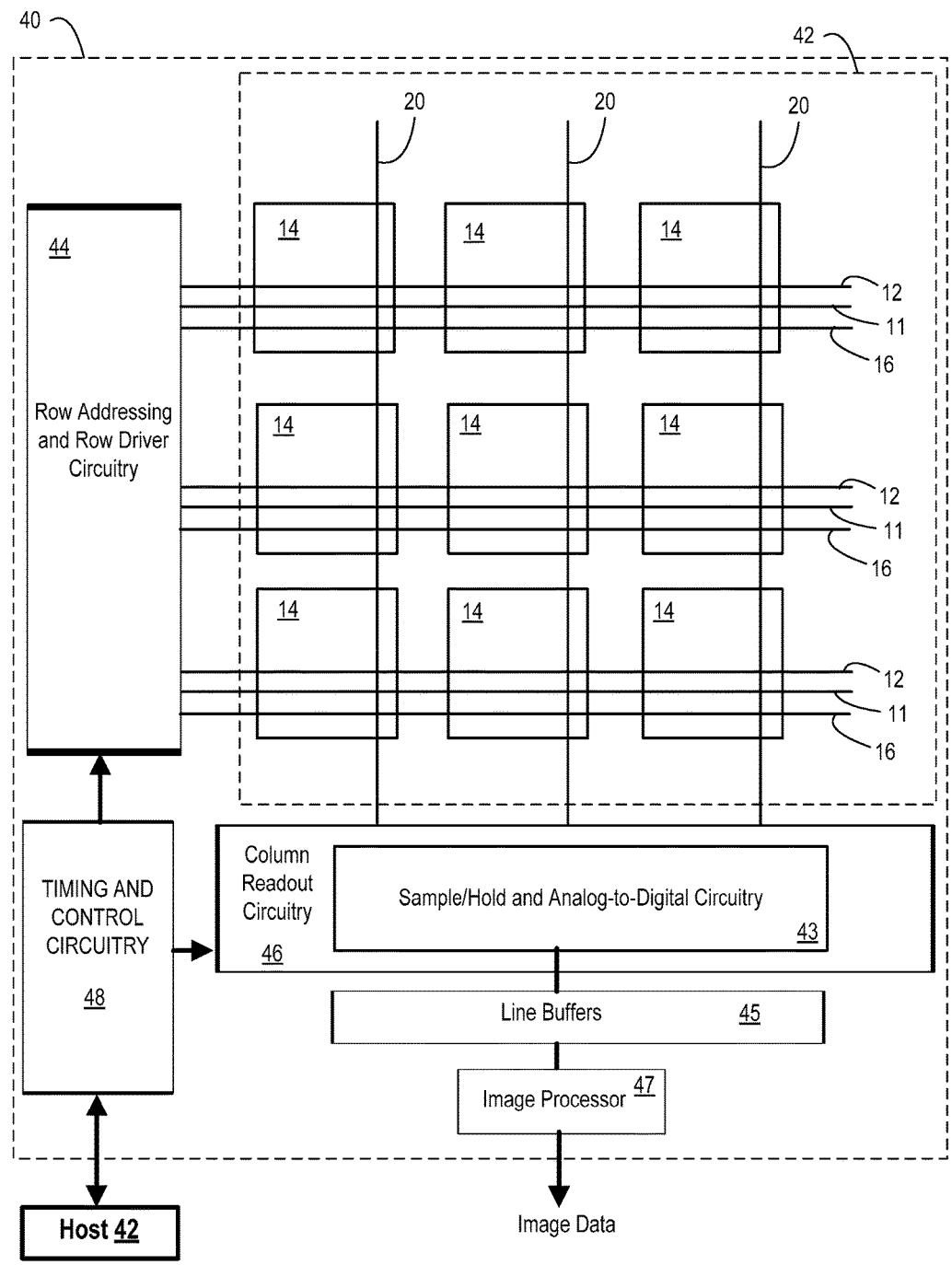
FIG. 4 depicts a block diagram of an illustrative multi-bit QIS image sensor 40 architecture that may be used to implement some embodiments in accordance with the present disclosure, including, for example, the illustrative embodiment described with respect to FIG. 3.

FIG. 4 depicts a block diagram of an illustrative multi-bit QIS image sensor 40 architecture that may be used to implement some embodiments in accordance with the present disclosure, including, for example, the illustrative embodiment described with respect to FIG. 3.

Jot array 42 typically includes a large number of jots arranged in an M×N array; however, image sensor 40 is shown as including a simplified pixel array 42 comprising a three by three array of jots 14, which, for ease of discussion, may each be configured similar to a 4T pixel circuit of a conventional CIS (e.g., but which may employ a pump-gate configuration or other high conversion gain configurations). And, in some embodiments, the jots may be shared jots (e.g., sharing certain jot readout circuitry).

Row Addressing and Row Driver Circuitry 44 generates transfer gate control signals on lines 11, row select signals on lines 16, an reset gate control signals on lines 12 (e.g., analogous to signals for a conventional 4T pixel). Column Readout Circuitry 46 includes analog-to-digital circuitry 43 (e.g., corresponding to ADC 37, in some embodiments) for sampling and digitizing output values readout from the jot array 42. Particularly, circuitry 43 may be implemented to comprise a plurality of A/D converters configured to implement column-parallel readout. In some embodiments, the circuitry 43 may be configured such that the readout circuitry associated with each column bus 20 may have a respective analog-to-digital converter (ADC), though in some embodiments two or more columns may share an ADC.

And, in accordance with some embodiments of the present disclosure, ADC circuitry 43 may be selectively controllable to provide dynamically variable conversion bit depth, n (e.g., any n, wherein 1≤n≤6) so as to dynamically control the exposure response characteristic of the multi-bit QIS array. As will be understood, the conversion rate may also be controlled, and such control may account for or be based on, for example, flux capacity considerations (e.g., including underlying variables), as well as power dissipation, etc. For example, it will also be understood in view of the foregoing that adjusting to single-bit may be desired to get maximum non-linearity, and perhaps to increase field rate to maintain flux capacity and SNR; or, adjusting to multi-bit depth n>1 may be desired to get higher linearity, and to adjust the field rate down to maintain flux capacity and reduce power dissipation.

Such ADC control (e.g., bit depth, conversion rate) may be provided by timing and control circuitry 48, which may also controls both the row addressing and row driver circuitry 44 and the column readout circuitry 43. For instance, timing and control circuitry controls the row addressing and row driver circuitry 44 for selecting the appropriate row for readout, and may, for example, provide timing control signals in accordance with rolling shutter readout or global shutter readout.

As indicated in FIG. 4, timing and control circuitry 48 may also communicably interface with a host 42 (e.g., a processor associated with a system comprising the image sensor), which may, for example, in some implementations, specify various control information (e.g., which may include settings relating to bit depth).

As schematically depicted, signals on column buses 20 are sampled and digitized by circuitry 43, and the digitized jot values provided by the ADCs according to a specified variable bit width may be provided to line buffers 45, which may be used to temporarily store digital signals from circuitry 43 for use by image processor 47. In general, any number of line buffers 45 may be included and, for example, each line buffer may be capable of storing digital signals representative of the charge signals that may be read from each pixel in a given row of pixels in the pixel array 42. Image processor 47 may be used to process the digital signals held in line buffers 36 to produce output image data that may be provided to a device external to the image sensor 40.

In accordance with some embodiments of multi-bit QIS and similar systems, the linearity of the response can be adjusted post-ADC-conversion. For example, in the illustrative embodiment of FIG. 5, image processor 47 may be configured to selectively implement postcapture adjustment of the linearity of the response by effectively reducing the bit depth of converted image data (i.e., reducing the bit depth of the data output by the ADC). Such post-ADC-conversion adjustment may be as an alternative, or in addition to, control of the nonlinearity by dynamically adjusting the actual bit depth applied by the ADC during conversion (e.g., as in the hereinabove-described embodiments).

By way of simple illustration, consider a multi-bit QIS, with say n=2, so that each jot is capable of holding 0, 1, 2 or 3 photoelectrons, with the multi-bit QIS having a 2-bit ADC (which may or may not be dynamically adjustable to have a 1-bit bit depth, depending on the implementation).

The response of the sensor will have the response curve for n=2 shown in FIG. 1, with its associated non-linearity. Consider then taking this same data and reprocessing it postcapture so that each converted signal greater than 1, that is, 2 or 3, is recoded as 1. Accordingly, effectively the FW for the same data has been reset to 1, and now reflects the non-linear response curve of the single-bit QIS, with an effective increase in relative exposure and worse SNR.

As noted, in various embodiments, such postcapture (and post-conversion) response adjustment can be applied alternatively or additionally to actually adjusting the ADC bit depth of the ADC to alter the linearity of the response curve.

Therefore, in some embodiments, for example, image processor may be under control of host 42, which selectively controls image processor 47 for executing post-conversion exposure response processing. Further, it will be understood that such post-conversion processing may be executed by host 47 or another offline processing system if the image sensor system may be configured to provide the ADC-converted signal.

As may be appreciated, there are many possible alternative implementations of a multi-bit QIS architecture that may embody controllable non-linearity of the QIS response in accordance with some embodiments of the present disclosure.

Some aspects of the present invention have been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

What is claimed is:

1. An image sensor comprising:
   an array of pixels, each pixel configured to accumulate photocharge corresponding to photoconversion of photons incident on the pixel;
   readout circuitry configured to discriminate individual photocharge, wherein the readout circuitry includes an analog-to-digital converter (ADC) configured to generate a digital signal having a maximum integer bit depth of nmax corresponding to a value of $(2^{nmax}-1)$, and wherein the value of the digital signal output by the readout circuitry for each pixel readout is (i) an integer number equal to the corresponding number of individual accumulated photocharge being readout when the number of individual accumulated photocharge being readout is between 0 and $(2^{nmax}-1)$, inclusive, and (ii) $(2^{nmax}-1)$ when the number of individual accumulated photocharge being readout is greater than $(2^{nmax}-1)$; and
   a controller comprising at least one of hardware, software, and firmware configured to selectively adjust the non-linearity of the exposure response of the image sensor, including selectively increasing a non-linearity of an exposure response so as to correspond to an exposure response for the pixels each having a full well capacity of $(2^n-1)$, wherein n is a positive integer less than nmax, and the non-linearity of the exposure response is based on photon arrival statistics; and
   wherein a least-significant-bit (LSB) of the ADC corresponds to no more than one photoelectron independent of the non-linearity of the exposure response being selectively adjusted, single-photon sensitivity and resolution thereby being maintained while varying the exposure response.

2. The image sensor according to claim 1, wherein the controller is configured to selectively adjust the bit depth of the ADC to be an integer value, m, that is less than nmax, such that the value of the digital signal output by the readout circuitry for each pixel readout is (i) an integer number equal to the corresponding number of individual accumulated photocharge being readout when the number of individual accumulated photocharge being readout is between 0 and $(2^m-1)$, inclusive, and (ii) $(2^m-1)$ when the number of individual accumulated photocharge being readout is greater than $(2^m-1)$, thereby selectively adjusting the non-linearity of the exposure response.

3. The image sensor according to claim 1, wherein the controller is configured to selectively reduce a effective bit depth of digital values output by the ADC to be an integer value, p, that is less than nmax, wherein the value of each of the digital signals output by the ADC (i) is not changed if the digital signal output by the ADC is between 0 and $(2_p-1)$, inclusive, and (ii) is adjusted to equal $(2_p-1)$ if the digital signal output by the ADC is greater than $(2_p-1)$, thereby selectively adjusting the non-linearity of the exposure response.

4. The image sensor according to claim 1, wherein the image sensor has less than about 0.3 e-rms read noise, and wherein an expected linearity of the image sensor output is determined by a maximum count of the ADC due to Poisson statistics.

5. The image sensor according to claim 1, wherein the ADC conversion bit depth can be varied by programming the sensor with either on-chip or off-chip electronics.

6. The image sensor according to claim 5, wherein the image sensor is configured such that an image sensor frame rate is increased and/or a power dissipation of the ADC is reduced upon varying the conversion bit depth.

7. The image sensor according to claim 1, wherein the image sensor is configured such that the bit depth of the ADC is clipped following conversion to a lesser number of bits to adjust the nonlinearity and overexposure latitude of the response by either hardware or by firmware or software.

8. The image sensor according to claim 1, wherein the image sensor is configured such that converted pixel signals from a number of successive fields are added together to form an output pixel value, wherein such addition is performed on-chip or off-chip.

9. The image sensor according to claim 1, wherein the image sensor is configured such that converted pixel signals in a local neighborhood of pixels, as defined for each added field, are digitally summed.

10. The image sensor according to claim 9, wherein, in the case of the image sensor being configured as a color sensor, the image sensor is configured such that converted pixel signals of a same color are summed.

11. The image sensor according to claim 1, wherein the exposure response corresponding to at least one n less than nmax is non-linear between a relative exposure of zero and a relative exposure of unity, wherein the relative exposure is a quanta exposure in photoelectrons divided by the full well capacity, $(2_n-1)$, for the given n.

12. An image sensor comprising a plurality of pixels monolithically integrated with an on-chip analog-to-digital converter (ADC) that is configured to convert a signal corresponding to readout of any photoelectrons stored in at least one of the pixels, wherein a maximum bit depth of the ADC is designed to not exceed 6 bits, and wherein a read noise is less than 0.3 e-rms, and wherein a least-significant-bit (LSB) of the ADC corresponds to no more than one photoelectron, and wherein the image sensor is configured to selectively vary an effective bit width, n, of the ADC so as to selectively vary a non-linearity of an exposure response of the image sensor between a relative exposure of zero and a relative exposure of unity, wherein the relative exposure is a quanta exposure in photoelectrons divided by a full well capacity, $(2^n-1)$, corresponding to the effective bit width, n.

13. The image sensor according to claim 12, wherein the exposure response is non-linear between a relative exposure of zero and a relative exposure of unity for each of a plurality of effective bit widths, n.

14. An image sensor comprising:
an array of pixels, each pixel configured to accumulate photocharge corresponding to photoconversion of photons incident on the pixel;
readout circuitry configured to discriminate individual photocharge, wherein the readout circuitry includes an analog-to-digital converter (ADC) configured to generate a digital signal having a maximum integer bit depth of nmax corresponding to a value of $(2_{nmax}-1)$; and
a controller comprising at least one of hardware, software, and firmware configured to selectively adjust a non-linearity of an exposure response of the image sensor, including selectively adjusting between a plurality of non-linear exposure responses, each of the plurality of non-linear exposure responses corresponding, respectively, to the pixels having a different full well capacity of $(2_n-1)$, wherein n is a positive integer not greater than nmax, and the non-linearity of the exposure response is based on photon arrival statistics; and
wherein a least-significant-bit (LSB) of the ADC corresponds to no more than one photoelectron independent of the non-linearity of the exposure response being selectively adjusted, single-photon sensitivity and resolution thereby being maintained while varying the exposure response.

15. The image sensor according to claim 14, wherein the controller and the ADC are configured to selectively adjust the non-linearity of the exposure response by selectively adjusting an effective bit depth of digital values output by the ADC.

16. The image sensor according to claim 14, wherein at least one of the plurality of non-linear exposure responses is non-linear over a relative exposure of zero to a relative exposure of unity, wherein the relative exposure is a quanta exposure in photoelectrons divided by the full well capacity, $(2_n-1)$.

17. The image sensor according to claim 14, wherein a plurality of the non-linear exposure responses are non-linear over a relative exposure of zero to a relative exposure of unity, wherein the relative exposure is a quanta exposure in photoelectrons divided by the full well capacity, $(2_n-1)$.

* * * * *